United States Patent [19]

Goldschmidt

[11] 4,307,466

[45] Dec. 22, 1981

[54] AUDIO SYSTEM FOR DRIVE-IN THEATERS

[76] Inventor: Hugh A. C. Goldschmidt, P.O. Box 1484, Redondo Beach, Calif. 90278

[21] Appl. No.: 112,358

[22] Filed: Jan. 15, 1980

[51] Int. Cl.³ .......................... H04H 1/10; H04B 3/60

[52] U.S. Cl. .......................................... 455/57; 455/56; 455/41; 455/127; 179/1 DD

[58] Field of Search .................. 455/3, 41, 49, 53, 55, 455/56, 57, 127, 103, 105; 179/1 DD

[56] References Cited

U.S. PATENT DOCUMENTS

| | | | |
|---|---|---|---|
| 2,979,607 | 4/1961 | Herzfeld | 455/3 |
| 3,078,348 | 2/1963 | McIntosh | 455/41 |
| 3,131,351 | 4/1964 | Herzfeld | 455/3 |
| 3,579,111 | 5/1971 | Johannessen | 455/127 |
| 3,980,996 | 9/1976 | Greenspan | 455/127 |
| 4,047,109 | 9/1977 | Sekiguchi | 455/280 |

*Primary Examiner*—Marc E. Bookbinder
*Assistant Examiner*—Tommy P. Chin
*Attorney, Agent, or Firm*—Fulwider, Patton, Rieber, Lee & Utecht

[57] ABSTRACT

A drive-in theater having an array of predesignated parking spaces and a central audio output device for generating a carrierless audio signal. Interface devices are located at the spaces and connected in parallel to the output device. Each interface device includes an oscillator that generates a carrier signal and modulates the carrier signal in accordance with the audio input so that the modulated carrier signal can be transferred to the radio antenna of an individual automobile.

1 Claim, 2 Drawing Figures

AUDIO SYSTEM FOR DRIVE-IN THEATERS

FIELD OF THE INVENTION

The present invention relates to audio systems for drive-in theaters, and, more particularly, to such systems that utilize the AM radios of automobiles to provide speakers.

BACKGROUND OF THE INVENTION

A conventional drive-in theater employs a centralized audio system that reads the soundtrack of a film and produces a carrierless amplitude modulated audio signal. That signal is distributed by wire to speakers at the individual parking spaces. It is the speakers that often account for a low quality sound and result in a continuing high-cost maintenance and replacement problem. They are often stolen, vandalized, accidently damaged, or adversely affected by weather conditions.

An alternative to the conventional deployment of speakers is the substitution for the entire conventional audio system of a relatively low power radio transmitter. This system broadcasts at a carrier frequency that can be received by a conventional AM automobile radio, thus eliminating the speakers completely. In other words, each patron simply listens to the audio portion of the film on the radio of his own automobile. An elaborate transmitting antenna system is often incorporated in such systems to make contact with the radio antenna of each automobile. One such system is described in U.S. Pat. No. 4,047,109 to Sekiguchi.

A number of marked disadvantages are associated with the use of known radio transmission systems in drive-in theaters. One problem is that this system, with its large radiating antenna, may interfere with radio reception in the surrounding area. It is often difficult or impossible to assess the extent to which such interference will occur until the system has been built and installed.

Another problem arises from the fact that some automobiles are not equipped with working radios or have such weak batteries that their radios cannot be used in this way. An individual speaker cannot readily be provided for such automobiles since a speaker will not respond properly to the available modulated carrier signal.

Still another disadvantage of the substitution of a control radio transmitter for an existing drive-in sound system of conventional construction is that essentially all components of the original system must be scraped and replaced. Moreover, it is usually impractical to replace only a portion of the system so that the operator of the theater has little opportunity to experiment with the system or phase it in over a period of time as his customers become accustomed to it.

It is a principle objective of the present invention to provide an improved audio system for drive-in theaters that employs automobile radios as a part of the system, but also incorporates a large part of the existing system. Another objective is to provide such a system that minimizes or eliminates interference with radio reception in the surrounding area. Still another objective is to provide such a system that is compatible with the use of conventional speakers and, therefore, permits partial as well as full conversion.

SUMMARY OF THE INVENTION

The present invention resides in a drive-in theater that employs a conventional central audio output device that generates a carrierless audio signal distributed to an array of parking spaces by a network of conductors. The network connects a plurality of interface devices to the output device, each interface device being associated with a particular parking space in the manner of a conventional speaker.

Each individual interface device includes an oscillator for generating a carrier signal, a modulator for amplitude modulating the carrier signal in accordance with the centrally generated audio signal, and an arrangement for transferring the modulated carrier signal to the radio antenna of an individual automobile. Preferably, the interface device is powered as well as modulated by the aduio signal and, therefore, does not require any other external power supply.

In one embodiment of the invention, each interface device includes a rechargeable battery connected to the oscillator that is charged by the audio signal. Before it is applied to the battery, the audio signal should be rectified. This can be accomplished by a diode that can be light emitting so that its illumination provides an indication of the modulation level of the audio signal.

A preferred form of the oscillator includes a resonant circuit which includes an indicator that also functions as the primary coil of an output transformer. A movable core within this coil provides for adjustment of the resonant frequency.

An arrangement can be provided for activating the oscillator in response to the presence of an audio signal. This arrangement can take the form of a semi-conductor switch, preferably a field-effect transistor, that is turned on when a capacitor connected to its gate is charged to a predetermined level. When the audio signal is present, it charges the capacitor, but the charge decays in the absence of an audio signal to stop the oscillation. Accordingly, deactivation of the oscillator occurs only after the audio signal has ceased for a predetermined period. Thus the carrier is continuous rather than intermittent, even though audio signal itself provides power for the oscillator.

Each interface device has about the same impedance as a conventional speaker. It is, therefore, possible to substitute speakers for selected interface devices within the system without any further modification.

Other features and advantages of the present invention will become apparent from the following detailed description, taken in conjunction with the accompanying drawings, which illustrate, by way of example, the principles of the invention.

DESCRIPTION OF THE PREFERRED EMBODIMENT

Figure 1:
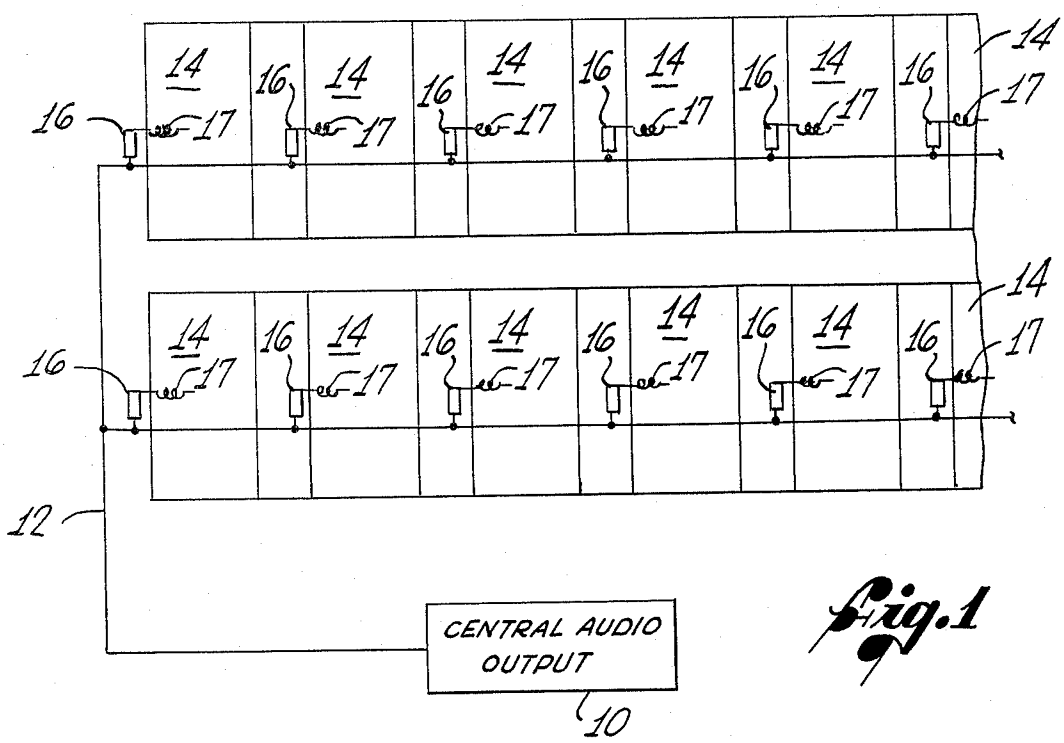
FIG. 1 is a diagramic illustration of a drive-in theater equipped with an audio system that is constructed in accordance with the present invention.

A drive-in theater, diagramatically represented in FIG. 1, incorporates an audio system constructed in accordance with the present invention. It includes a central audio output device 10 that reads the soundtrack of a film being shown and generates a carrierless audio signal in the conventional manner. A signal distribution network 12 supplies the audio signal to an array of parking spaces 14.

At each parking space 14 is an interface device 16, the various interface devices being connected in parallel by the network 12. The function of the interface devices 16 is to convert the audio signal to an amplitude modulated carrier signal that can be processed by the radio receiver of an individual automobile, permitting the sound accompanying the film to be heard on the radio speakers of automobiles parked in the spaces 14. Each interface device 16 is accordingly provided with a transfer device 17 in the form of a coiled wire that can be placed over an exposed automobile antenna or positioned along the windshield adjacent to a hidden antenna.

Figure 2:
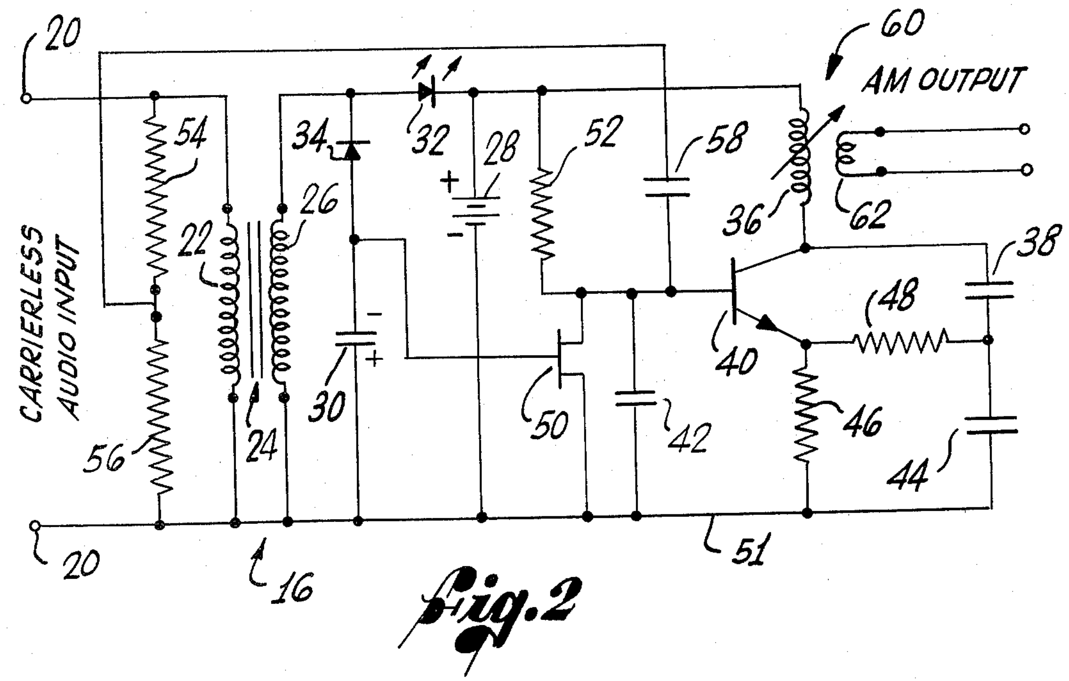
FIG. 2 is a schematic illustration of an individual interface device incorporated in the system of FIG. 1.

An individual interface device 16, shown diagramatically in FIG. 2, receives the audio input from the network 12 at a pair of input terminals 20 and applies it across the primary winding 22 of an input transformer 24. A secondary winding 26 of this transformer 24 causes a stepped up voltage to be applied across a rechargeable battery 28 and across a control capacitor 30 that is connected in parallel with the battery.

A diode 32 is connected between the secondary winding 26 of the input transformer 24 and the battery 28 to act as a rectifier so that the battery is charged during alternate half-cycles of the audio input signal. When the direction of current flow is such that the battery 28 is not charged, the control capacitor 30 is charged by current rectified by a diode 34 connected in series with the capacitor. An instantaneous visual indication of the presence and strength of the audio input signal is provided by the first diode 32 which is light emitting.

The output of the battery 28 is applied to a Colpitts oscillator that includes, as basic components, a movable core inductor 36, a capacitor 38, and an NPN modulation transistor 40. The inductor 36 and the capacitor 38 are combined to form a resonant circuit, both being connected to the collector of the modulation transistor 40. The inductor 36 is connected between the positive side of the battery 28 and the collector, while the capacitor 38 is connected between the collector and the emitter of the transistor 40. Feedback to the base of the transistor 40 is provided by two capacitors 42 and 44 and two resistors 46 and 48.

The base and emitter of the modulation transistor 40 are also connected across the source and drain of a field-effect transistor 50 that is in parallel with the first feedback capacitor 42. The first feedback resistor 46 that provides a stable DC bias is connected between the emitter of the oscillator transistor 40 and a line 51 that connects the two feedback capacitors 42 and 44 with the negative terminal of the battery 30. The second feedback resistor 48, which has the lower resistance of the two, is connected between the resonant circuit capacitor 38 and one of the feedback capacitors 44. The feedback is a quantitative function of the relative capacitances of the feedback capacitor 44 and the resonant circuit capacitor 38.

The FET 50 is also connected in series with an upsteam resistor 52 across the output of the battery 28.

The gate of the FET 50 is connected to the control capacitor 30. As long as the control capacitor 30 is adequately charged down by the audio input signal, the FET 50 remains in a high resistance state and acts in combination with the resistor 52 to maintain a forward bias at the base of the modulation transistor 40. Under these conditions oscillation continues. If however, the control capacitor 30 discharges to a predetermined level, which will occur after a prolonged absence of an audio input signal, the FET 50 exhibits a low resistance and acts as a shunt. The modulation transistor 40 is then no longer forward biased and the carrier signal oscillation stops. Typically, it would require the absence of audio input for about 20 minutes for the oscillator to stop generating a carrier signal, although circuit parameters can easily be varied to adjust this delay as desired.

To provide modulation of the oscillator output, a voltage divider is formed by two resistors 54 and 56 connected in series across the primary winding 22 of the input transformer 24 in parallel with the control capacitor 30 and the battery 28. This voltage divider 54, 56 provides an input, through a coupling capacitor 58, to the base of the modulation transistor 40. Preferably, about one sixtieth of the input voltage is applied to the transistor 40 as a modulation signal. This proportion may be adjusted by changing the relative values of the voltage divider resistors 54 and 56.

It will be understood from the above that when an audio signal is first supplied it charges the control capacitor 30, causing oscillation to commence, thereby providing a carrier signal. At the same time, the audio signal charges the battery 28 which supplies power to keep the oscillator in operation during pauses in the audio input. Thus, the carrier signal is continuous, despite temporary interruptions in the audio signal.

After the film has ended and the audio signal ceases, the carrier signal will eventually terminate due to the discharge of the control capacitor 30, although the battery 28 will remain charged for a much longer period. A small battery discharge current will flow through the resistor 52 and the FET 50 but this loss is insignicant.

The invention this provides a low cost interface device that converts a carrierless audio signal to a modulated carrier signal that can be processed by a conventional AM automobile radio. It requires no power supply other than the audio signal itself. The interface device 16 has about the same impedance as a conventional speaker, about 8 ohms, and may, therefore, be substituted for an individual speaker without modifications to the rest of the system. A single installation may include a mixture of conventional speakers and interface devices that can be interchanged at will.

While a particular form of the invention has been illustrated and described, it will be apparent that various modifications can be made without departing from the spirit and scope of the invention.

I claim:

1. In a drive-in theater having an array of predesigned parking spaces, a central audio output device for generating a carrierless audio signal, and a network of conductors for distributing said signal to said parking spaces, wherein the improvement comprises a plurality of interface devices each located at and associated with a particular one of said parking spaces and connected in parallel to said audio output device by said network to receive said audio signal as an input, each of said interface devices comprising:

oscillator means for generating a carrier signal, said oscillator means including an inductor and a capacitor arranged as a resonant circuit and a modulation transistor to which said resonant circuit is connected;

a secondary winding arranged for mutual inductance with said inductor to form an output transformer;

oscillator control means for activating said oscillator means in response to the presence of said audio signal and for deactivating said oscillator in response to the absence of said audio signal, said oscillator control means comprising a field-effect transistor and a control capacitor connected to the gate of said transistor and arranged to forward bias to said transistor upon charging of said control capacitor;

means for rectifying said audio signal to charge said control capacitor;

voltage divider means for supplying a portion of said audio signal to said oscillator transistor;

a rechargeable battery connected to said oscillator means to provide power for said oscillator means;

means for charging said battery with said audio signal comprising a diode arranged to rectify said audio signal, said diode being light emitting to indicate the presence of said audio signal; and transfer means connected to said output transformer for inputing said audio signal to the radio antenna of an individual automobile.

* * * * *